US012794272B2

(12) United States Patent
Wu et al.

(10) Patent No.: US 12,794,272 B2
(45) Date of Patent: Nov. 10, 2026

(54) WIRELESS ACOUSTIC POWER RECEIVER FOR A LOAD

(71) Applicant: Imec VZW, Leuven (BE)

(72) Inventors: Lixiang Wu, Heverlee (BE); Bogdan Vysotskyi, Heverlee (BE); Guilherme Brondani Torri, Bierbeek (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 19/243,485

(22) Filed: Jun. 19, 2025

(65) Prior Publication Data

US 2025/0392166 A1 Dec. 25, 2025

(30) Foreign Application Priority Data

Jun. 21, 2024 (EP) .................................... 24183591

(51) Int. Cl.

*H02J 50/15* (2016.01)
*B06B 1/06* (2006.01)
*H02J 50/40* (2016.01)

(52) U.S. Cl.

CPC ............ *H02J 50/15* (2016.02); *B06B 1/0633* (2013.01); *H02J 50/40* (2016.02)

(58) Field of Classification Search

CPC .......... H02J 50/15; H02J 50/40; H02J 50/001; H02J 50/402; H02J 50/20; B06B 1/0633; G08C 23/02; H04B 11/00

See application file for complete search history.

(56) References Cited

U.S. PATENT DOCUMENTS

| | | | | |
|---|---|---|---|---|
| 7,848,815 | B2 | 12/2010 | Brisken et al. | |
| 9,008,776 | B2 | 4/2015 | Cowan et al. | |
| 10,554,079 | B2 | 2/2020 | Park | |
| 2012/0203306 | A1* | 8/2012 | Sarvazyan ............. | A61B 90/39 607/61 |
| 2013/0294201 | A1* | 11/2013 | Hajati .................. | B06B 1/0629 310/334 |

(Continued)

OTHER PUBLICATIONS

Extended European Search Report and Search Opinion, Application No. EP 24183591.7, mailed Jan. 29, 2025, 9 pages.

(Continued)

*Primary Examiner* — Regis J Betsch
*Assistant Examiner* — Alex W Lam
(74) *Attorney, Agent, or Firm* — McDonnell Boehnen Hulbert & Berghoff LLP

(57) ABSTRACT

This disclosure relates to wireless acoustic power reception. The disclosure includes a wireless acoustic power receiver comprising one or more acoustic transducers, and a corresponding method for operating the receiver. Each acoustic transducer is configured to: capture a first alternating current (AC) signal with receptively a first electrode and a second electrode; capture a second AC signal with receptively the first electrode at a first phase and the second electrode at a second phase, wherein the first AC signal and the second AC signal are respectively based on vibrations of a first vibration mode and a second vibration mode of a diaphragm that are respectively induced by a first acoustic frequency and a second acoustic frequency; and provide an electrical power of the first AC signal, the second AC signal at the first phase, and the second AC signal at the second phase to a load.

20 Claims, 12 Drawing Sheets

(56) References Cited

U.S. PATENT DOCUMENTS

| | | | | |
|---|---|---|---|---|
| 2015/0333528 | A1* | 11/2015 | Leabman | H02J 50/15 307/104 |
| 2016/0310749 | A1 | 10/2016 | Moore et al. | |
| 2019/0157911 | A1* | 5/2019 | Park | H02J 50/15 |
| 2022/0131424 | A1* | 4/2022 | Charthad | H02J 50/402 |

OTHER PUBLICATIONS

Birjis, Yumna, Siddharth Swaminathan, Haleh Nazemi, Gian Carlo Antony Raj, Pavithra Munirathinam, Aya Abu-Libdeh, and Arezoo Emadi. "Piezoelectric micromachined ultrasonic transducers (PMUTs): performance metrics, advancements, and applications." Sensors 22, No. 23 (2022): 9151.

Herrera, Bernard, Pietro Simeoni, Gabriel Giribaldi, Luca Colombo, and Matteo Rinaldi. "Scandium-doped aluminum nitride pmut arrays for wireless ultrasonic powering of implantables." IEEE Open Journal of Ultrasonics, Ferroelectrics, and Frequency Control 2 (2022): 250-260.

Rong, Zhicong, Menglun Zhang, Yuan Ning, and Wei Pang. "An ultrasound-induced wireless power supply based on AlN piezoelectric micromachined ultrasonic transducers." Scientific Reports 12, No. 1 (2022): 16174.

* cited by examiner

WIRELESS ACOUSTIC POWER RECEIVER FOR A LOAD

CROSS-REFERENCE TO RELATED APPLICATIONS

The present application is a non-provisional patent application claiming priority to European Patent Application No. 24183591.7, filed Jun. 21, 2024, the contents of which are hereby incorporated by reference.

TECHNICAL FIELD

The present disclosure relates to wireless acoustic power reception. The disclosure proposes a wireless acoustic power receiver for a load, and a corresponding method for operating the wireless acoustic power receiver. The wireless acoustic power receiver comprises one or more specifically adapted acoustic transducers.

BACKGROUND

In the field of energy transmission systems, wireless technologies capable of transferring energy from one device to another over a distance and without intermediary physical connection have proven their worth in terms of flexibility and convenience, compared to their wired counterparts. In many applications where direct access to the recipients is complex, could lead to undesirable and hazardous consequences, or is simply not technically possible, wireless power transfer (WPT) technologies offer largely beneficial alternatives for efficient power delivery. For example, WPT can be used for powering sensors, actuators, transducers, batteries nested in remote or inaccessible locations.

In biomedical applications, remote power delivery systems eliminate the use of wires and thus repetitive invasive procedures of installation and adjustment, thereby increasing the convenience and safety of bioelectronic technologies. By comparison, wired powering of biomedical applications often limits the patient's mobility due to the space occupied, and may provoke skin irritations or even tissue infections. Removing physical connections may therefore reduce the patient's discomfort.

In another scenario, one may consider the use of single-use batteries powering devices implanted inside a body. Conventional lithium-based batteries of reasonable size that are used to power implants usually last between 5 and 15 years, even for the power levels lower than 1 mW. With such a battery lifetime, the power source is likely to be replaced multiple times over the patient's life span. This leads to large costs on top of high risks of complications during the replacement surgery, for example, in proximity of vital organs like the heart. Wireless powering enables remote recharging and therefore the use of only a single battery. Also, it allows for a reduction in environmental costs, as having a single battery limits resource consumption and waste generation to achieve the same result.

Aside from batteries and medical implants, other biomedical applications that may benefit from remote power delivery relate to neural and tissue stimulation. In this context, external stimuli may be applied through non-invasive means to excitable tissues such as muscles, nerves, or directly the brain to elicit responses or modulate the activity of targeted biological tissues. This stimulation may serve various purposes, including research, medical treatments, and therapeutic interventions.

In the case of a wireless receiver, directivity is a measurement of the wave detected in a solid angle or range of solid angles that is centered on a given direction. Depending on the angle, the sensitivity to incoming waves may vary. Directivity may be represented in the form of multiple lobes, which represent regions of increased sensitivity in specific directions from where the incoming waves may be more or less efficiently captured.

The following types of lobes may be distinguished:

- Main lobe: The primary lobe in the sensitivity pattern of a receiver. It is the region where most of the sensitivity is concentrated, typically, in the direction of maximum reception.
- Side lobes: Additional lobes in the sensitivity pattern at angles away from the main lobe, and usually at lower level compared to the main lobe.
- Back lobe: An additional lobe in the sensitivity pattern in the opposite direction of the main lobe.

A conventional piezoelectric micromachined ultrasonic transducer (pMUT) element may have multiple flexural vibration modes, a circular geometry, and may comprise a multilayer diaphragm that contains a piezoelectric layer sandwiched between a top electrode and a bottom electrode on top of an elastic layer. The vibration modes corresponding to this circular configuration may be denoted by the couples (m,n) such as (0,1), (0,2), (0,3), (1,1), (1,2), (1,3), etc., where m determines the number of radial nodal lines and n determines the number of nodal circles.

SUMMARY

In view of the above, an objective of this disclosure is to provide an improved wireless power receiver that enables a high received power efficiency. Another objective is to receive power over a longer distance, while having low attenuation through media, for example, biological tissue. Another objective is to provide a wireless power receiver that is more robust against misalignment.

These and other objectives are achieved by the solution of this disclosure as described in the independent claims. Advantageous implementations are further described in the dependent claims.

This disclosure is based on the following considerations. To power a device located in a hardly accessible location within a body, wired connections are not preferred as they can cause discomfort or even damage the body. Local power sources are also flawed, as they are too often quite large and require relatively frequent replacements, with possibly detrimental consequences resulting from those procedures.

Overall, enabling a safe and power-efficient method to provide energy to a targeted recipient may be valuable for a large range of applications. This disclosure aims to remotely deliver energy to implants through acoustic waves.

Compared to existing and well-known wireless technologies such as induction, or radio frequency waves, acoustic waves bear some advantageous properties over the others. Firstly, acoustic waves usually experience less attenuation in biological tissues than other alternatives, allowing them to reach greater depths to deliver a required energy with a given power. Secondly, in similar conditions, acoustic waves do not cause as much heating nor do they pose as much health risks as other alternatives, which means that safety limits in terms of power density may be raised, and therefore more power density can be provided. Thirdly, acoustic receivers can be significantly miniaturized compared to their current alternatives, allowing them to be coupled with smaller and less intrusive implants, which adds to the comfort of the user. Lastly, acoustic waves are compatible with beam steering and focusing techniques, and thus energy can be efficiently delivered towards a targeted location with minimal losses.

PMUTs, as mentioned above, are good candidates for transmitting and receiving energy in the form of acoustic waves. In particular, to increase the bandwidth, multiple pMUTs can be combined with different dimensions, for example, with different resonance frequencies, into one array, or structures may be designed with multiple resonance modes, for example, a fundamental resonance mode and higher order resonance modes. Conventional ultrasonic transducers fabricated using bulk piezoelectric materials cannot achieve this.

Depending on the method, an excitation mode can be chosen. That can be done in the case of an acoustic sensor such as a pMUT, by using specific frequencies, for example, resonant frequencies, and/or specific angle of incidence for the excitation wave.

A first aspect of this disclosure provides a wireless acoustic power receiver for a load, the receiver comprising one or more acoustic transducers, each acoustic transducer comprising a diaphragm, a first electrode provided on the diaphragm, and a second electrode provided on the diaphragm, wherein each acoustic transducer of the one or more acoustic transducers is configured to: receive one or more acoustic waves comprising a first acoustic frequency and a second acoustic frequency with the diaphragm, wherein the first acoustic frequency is different from the second acoustic frequency; capture a first alternating current (AC) signal with receptively the first electrode and the second electrode, wherein the first AC signal is based on vibrations of a first vibration mode of the diaphragm that are induced by the first acoustic frequency; capture a second AC signal with receptively the first electrode at a first phase and the second electrode at a second phase, wherein the second AC signal is based on vibrations of a second vibration mode of the diaphragm that are induced by the second acoustic frequency, wherein the first vibration mode is different from the second vibration mode, and wherein the first phase is different from the second phase; provide an electrical power of the first AC signal from respectively the first electrode and the second electrode to the load; provide an electrical power of the second AC signal at the first phase from the first electrode to the load; and provide an electrical power of the second AC signal at the second phase from the second electrode to the load.

In some examples, the one or more acoustic waves may be ultrasound waves. In some examples, the one or more acoustic waves may comprise a first acoustic wave and a second acoustic wave, wherein the first acoustic frequency may be a center frequency of the first acoustic wave, and the second acoustic frequency may be a center frequency of the second acoustic wave. Alternatively, the first acoustic frequency and the second acoustic frequency may each be an acoustic frequency of the same wave.

The diaphragm may be a piezoelectric diaphragm, for example, a piezoelectric membrane. The diaphragm may be a membrane, plate, or shell.

The first AC signal captured with the first electrode may have the same phase or a different phase as the first AC signal captured with the second electrode.

The first vibration mode may be a fundamental vibration mode of the diaphragm. For example, the first vibration mode may be a (0,1) vibration mode and/or the second vibration mode may be a (1,1) vibration mode. Alternatively, the first vibration mode and/or the second vibration mode may be other vibration modes. For example, the first vibration mode may be a (0,2) vibration mode and/or the second vibration mode may be a (1,2) vibration mode.

The second phase and the first phase may have a 180° phase difference.

The second vibration mode may or may not be a point symmetric vibration mode. For example, the second vibration mode may or may not be a (0,2) vibration mode.

The electrical power of the first AC signal, the electrical power of the second AC signal at the first phase, and the electrical power of the second AC signal at the second phase may be summed and/or simultaneously provided to the load. For example, the fact that the first phase and the second phase are different from each other may not reduce the power of the second AC signal, which is simultaneously received and provided to the load.

Thus, power can be efficiently received and provided to the load in a wireless manner. The wireless acoustic power receiver of the first aspect enables a high average power efficiency, can receive power over a long distance, and is robust against misalignment.

In an implementation form of the first aspect, for each acoustic transducer the receiver further comprises: a first dual-frequency impedance matching circuitry adapted to and electrically connected to the first electrode of the acoustic transducer, and electrically connectable to the load; and a second dual-frequency impedance matching circuitry adapted and electrically connected to the second electrode of the acoustic transducer and electrically connectable to the load, wherein each acoustic transducer of the one or more acoustic transducers is configured to: provide the electrical power of the first AC signal through respectively the first dual-frequency impedance matching circuitry and the second dual-frequency impedance matching circuitry to the load; provide the electrical power of the second AC signal at the first phase from the first electrode through the first impedance matching circuitry to the load; and provide the electrical power of the second AC signal at the second phase from the second electrode through the second impedance matching circuitry to the load.

Each dual-frequency impedance matching network or circuitry may be configured to match the two AC signals at the same time.

For each acoustic transducer, the first dual-frequency impedance matching circuitry and the second dual-frequency impedance matching circuitry may be configured to simultaneously provide the electrical power of the first AC signal through respectively the first dual-frequency impedance matching circuitry and the second dual-frequency impedance matching circuitry to the load. The electrical power of the second AC signal at the first phase from the first electrode may be provided through the first impedance matching circuitry to the load. The electrical power of the second AC signal at the second phase from the second electrode may be provided through the second impedance matching circuitry to the load.

An impedance of the first electrode may be matched with the first dual-frequency impedance matching circuitry to an impedance of the load for a frequency of the first AC signal and for a frequency of the second AC signal, and an impedance of the second electrode may be matched with the second dual-frequency impedance matching circuitry to the impedance of the load for the frequency of the first AC signal and for the frequency of the second AC signal.

The first dual-frequency impedance matching circuitry and/or the second dual-frequency impedance matching circuitry may each work for both the first and second AC signal at the same time. The first dual-frequency impedance matching circuitry and/or the second dual-frequency impedance matching circuitry may each be a combination of two basic impedance matching networks and may be optimized to match two center frequencies without significantly disturbing each other.

In an implementation form of the first aspect, for each acoustic transducer the receiver further comprises one or more rectifiers or AC to direct current (AC-DC) converters, for example, one or more rectifiers, wherein the one or more rectifiers are configured to convert the electrical power of the first AC signal, the electrical power of the second AC signal at the first phase, and the electrical power of the second AC signal at the second phase to at least one DC power, wherein the one or more rectifiers are further configured to provide the at least one DC power to the load.

The one or more rectifiers may be electrically connected to the first dual-frequency impedance matching circuitry, the second dual-frequency impedance matching circuitry, and electrically connectable to the load.

In a further implementation form of the first aspect, the second acoustic frequency is less than 5 times larger, for example, less than 3 or 4 times larger, than the first acoustic frequency, or the first acoustic frequency is less than 5 times larger, for example, less than 3 or 4 times larger, than the second acoustic frequency.

In a further implementation form of the first aspect, the second vibration mode has the next higher resonance frequency of the diaphragm following a resonance frequency of the first vibration mode, or the first vibration mode has the next higher resonance frequency of the diaphragm following a resonance frequency of the second vibration mode.

In a further implementation form of the first aspect, each acoustic transducer of the one or more acoustic transducers is configured to: simultaneously capture the second AC signal at the first phase and the first AC signal with the first electrode, and/or simultaneously capture the second AC signal at the second phase and the first AC signal with the second electrode.

In a further implementation form of the first aspect, each acoustic transducer of the one or more acoustic transducers is configured to: simultaneously capture the second AC signal at the first phase with the first electrode and the second AC signal at the second phase with the second electrode.

In a further implementation form of the first aspect, the one or more acoustic transducers are a plurality of acoustic transducers, wherein the plurality of acoustic transducers form an array of acoustic transducers on at least one outer surface of the receiver.

In a further implementation form of the first aspect, the at least one outer surface forms a closed cross section.

In a further implementation form of the first aspect, the at least one outer surface forms an open cross section.

In a further implementation form of the first aspect, the array of acoustic transducers comprises one or more 1-dimensional (1D) arrays of acoustic transducers, each 1D array of acoustic transducers comprising two or more acoustic transducers that are uniformly distributed along the at least one outer surface, for example, along the entire closed cross section.

In a further implementation form of the first aspect, the at least one outer surface is a curved surface or at least one flat surface.

In a further implementation form of the first aspect, the at least one outer surface is at least one outer curved surface.

In a further implementation form of the first aspect, the at least one outer surface is a flat surface.

In a further implementation form of the first aspect, the receiver is configured to at least partially enclose the load.

In a further implementation form of the first aspect, the plurality of acoustic transducers comprise a first acoustic transducer and a second acoustic transducer, wherein the first acoustic transducer is configured to receive the one or more acoustic waves at a first angle of incidence relative to the diaphragm of the first acoustic transducer, and wherein the second acoustic transducer is configured to receive the one or more acoustic waves at a second angle of incidence relative to the diaphragm of the second acoustic transducer, wherein the second angle of incidence is different from the first angle of incidence.

Thus, the one or more acoustic waves can be received with multiple acoustic transducers, or more acoustic transducers compared to conventional receivers, as the directivity of each acoustic transducer may be improved.

In a further implementation form of the first aspect, the load is one of: a medical implant, a device for use underwater, for example, an underwater sensor, a device for use in air, for example, a sensor for use in air, and an Internet of Things (IoT) system.

In a further implementation form of the first aspect, each acoustic transducer of the one or more acoustic transducers comprises a piezoelectric diaphragm and/or is a pMUT, or wherein each acoustic transducer of the one or more acoustic transducers is a capacitive micromachined ultrasound transducer (cMUT).

In a further implementation form of the first aspect, for each acoustic transducer of the one or more acoustic transducers, the first electrode and the second electrode are formed symmetrical to each other and/or are arranged symmetrically on the diaphragm.

In a further implementation form of the first aspect, for each acoustic transducer of the one or more acoustic transducers, at least one of the first electrode, the second electrode, and the diaphragm has a shape that is one of: elongated, square, rectangular, oval, apodised, and circular.

For example, the first electrode and the second electrode each may have a shape that is one of: elongated, square, rectangular, oval, apodised, and circular.

In a further implementation form of the first aspect, an inner surface of the receiver comprises at least one of: a battery, a circuitry, an actuator, a sensor, and one or more other transducers.

In a further implementation form of the first aspect, each acoustic transducer of the one or more acoustic transducers is covered with an electrical insulation layer.

A second aspect of this disclosure provides a method of operating a wireless acoustic power receiver for a load, wherein the receiver comprises one or more acoustic transducers, each acoustic transducer comprising a diaphragm, a first electrode provided on the diaphragm, and a second electrode provided on the diaphragm, wherein, for each acoustic transducer of the one or more acoustic transducers, the method comprises: receiving one or more acoustic waves comprising a first acoustic frequency and a second acoustic frequency with the diaphragm, wherein the first acoustic frequency is different from the second acoustic frequency; capturing a first AC signal with receptively the first electrode and the second electrode, wherein the first AC signal is based on vibrations of a first vibration mode of the diaphragm that are induced by the first acoustic frequency; capturing a second AC signal with receptively the first electrode at a first phase and the second electrode at a second phase, wherein the second AC signal is based on vibrations of a second vibration mode of the diaphragm that are induced by the second acoustic frequency, wherein the first vibration mode is different from the second vibration mode, and wherein the first phase is different from the second phase; providing an electrical power of the first AC signal from respectively the first electrode and the second electrode to the load; providing an electrical power of the second AC signal at the first phase from the first electrode to the load; and providing an electrical power of the second AC signal at the second phase from the second electrode to the load.

The method of the second aspect may have implementation forms that correspond to the implementation forms of the wireless acoustic power receiver of the first aspect. The method of the second aspect and its implementation forms allows to achieve the advantages and effects described above for the wireless acoustic power receiver of the first aspect and its respective implementation forms.

In this disclosure, the term "pMUT," as used above, may refer to a microscale device that converts electrical energy into ultrasonic energy, and vice versa, by using the flexural motion or thickness extension of a thin membrane coupled with, or integrating a thin piezoelectric film.

In this disclosure, the term "WPT" may, for example, refer to a transmission of electrical energy from a power source to an electrical load without the need of physical conductors such as wires or cables. Instead, electromagnetic fields or waves may be utilized to transfer power from the transmitter (sender) to the receiver (load). Conventional WPT methods include inductive coupling, resonant inductive coupling, radio frequency waves, and ultrasound waves. WPT has a wide range of applications such as charging wearables, powering implantable medical devices, charging vehicles, and powering sensors and actuators in hard-to-reach or hazardous environments.

In this disclosure, the term "ultrasound" may for example refer to sound with frequencies above the range of sensitivity of human hearing, for example, greater than 20 kHz.

In this disclosure, the term "alignment tolerance" may refer to a sensitivity of a device to a combination of angular and translational misalignment from another device with which it interacts.

In this disclosure, the term "beam steering" may refer to an ability to control the direction of a transmitted beam of acoustic waves, to focus it on a specific target. For wireless power delivery, beam steering techniques may be used to direct energy towards a desired location with precision.

BRIEF DESCRIPTION OF THE FIGURES

The above-described aspects and implementation forms will be explained in the following description of specific embodiments in relation to the enclosed drawings, in which.

DETAILED DESCRIPTION

Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

Figure 1:
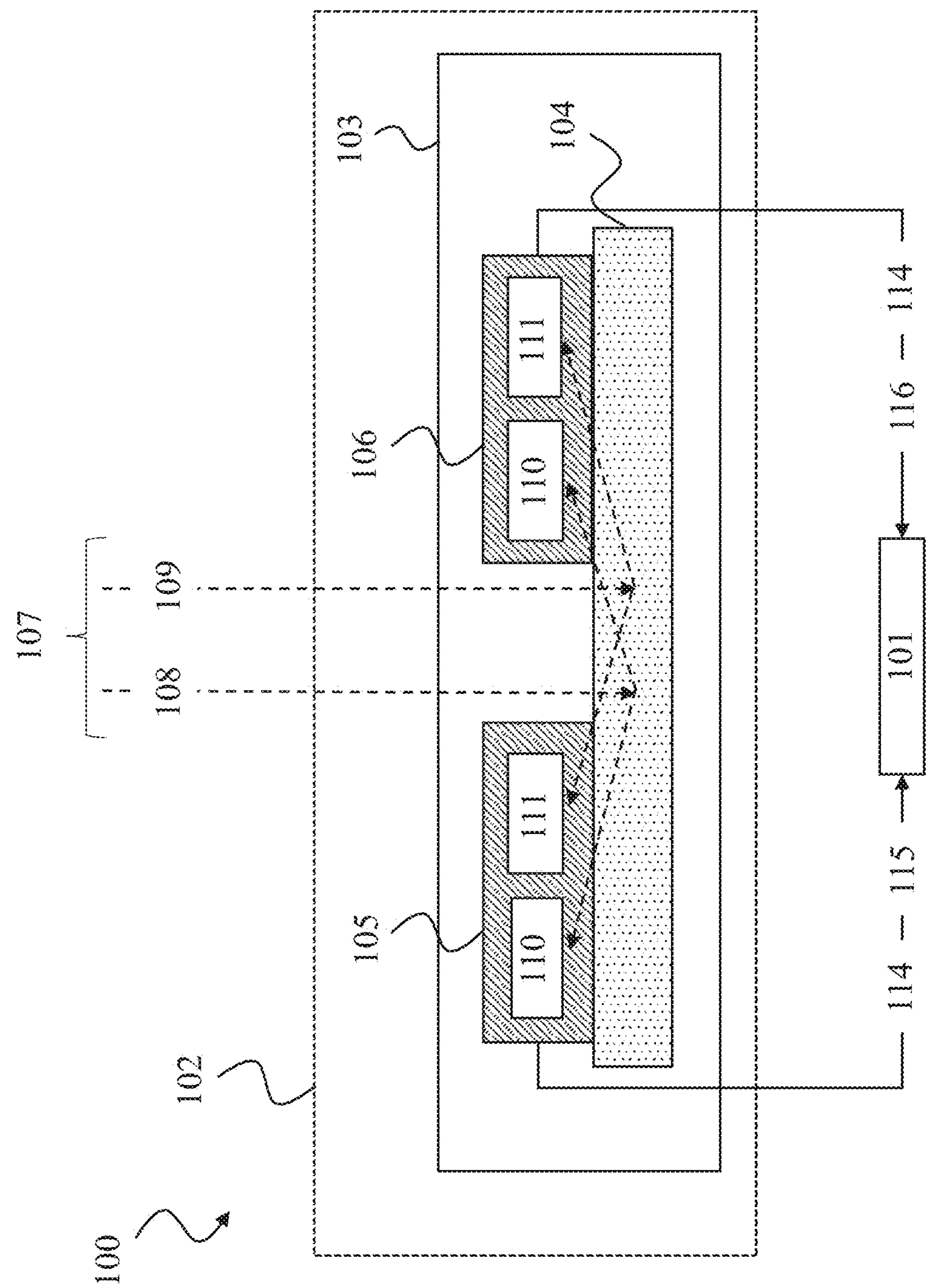
FIG. 1 shows a wireless acoustic power receiver according to this disclosure.

FIG. 1 shows a wireless acoustic power receiver 100 according to this disclosure. The wireless acoustic power receiver 100 is for a load 101, i.e., may be used to power the load. The wireless acoustic power receiver 100 may be integrated with the load 101. The wireless acoustic power receiver 100 may be integrated with or comprised in a medical implant, or similar biomedical application. The load 101 may be a battery, for instance, for powering the medical implant or similar biomedical application.

The wireless acoustic power receiver 100 comprises one or more acoustic transducers 102, and in some examples may comprise an array of acoustic transducers 102 (the reference sign 102 denotes the set, array, or plurality of acoustic transducers 103). Each acoustic transducer 103 of the one or more acoustic transducers 102 comprises a diaphragm 104 (e.g. a membrane), a first electrode 105 provided on the diaphragm 104, and a second electrode 106 provided on the diaphragm 104. Each acoustic transducer 103 may comprise one or more further electrodes, which may be provided on the diaphragm 104 on the other side of the first and second electrode 105, 106.

Each acoustic transducer 103 of the one or more acoustic transducers 102 is configured to receive one or more acoustic waves 107, wherein the one or more acoustic waves 107 comprise a first acoustic frequency 108 and a second acoustic frequency 109. The one or more acoustic waves 108 are received with the diaphragm 104 and may vibrate the diaphragm 104.

The diaphragm 104 may have more than one vibration mode. The acoustic transducer 103 is configured to capture a first AC signal 110 with respectively the first electrode 105 and the second electrode 106, wherein the first AC signal

110 is based on vibrations of a first vibration mode of the diaphragm 104 that are induced by the first acoustic frequency 108 (which is indicated in FIG. 1 by the dashed arrows between the first acoustic frequency 108, the first electrode 105, and the second electrode 106). The acoustic transducer 103 is also configured to capture a second AC signal 111 with respectively the first electrode 105 at a first phase and the second electrode 106 at a second phase, wherein the second AC signal 111 is based on vibrations of a second vibration mode of the diaphragm 104 that are induced by the second acoustic frequency 109 (which is indicated in FIG. 1 by the dashed arrows between the second acoustic frequency 109, the first electrode 105, and the second electrode 106).

Further, each acoustic transducer 103 of the one or more acoustic transducers 102 is configured to provide an electrical power of the first AC signal 114 from respectively the first electrode 105 and the second electrode 106 to the load 101. The acoustic transducer 103 is also configured provide an electrical power of the second AC signal at the first phase 115 from the first electrode 105 to the load 101, and to provide an electrical power of the second AC signal at the second phase 116 from the second electrode 106 to the load 101. In this way, the load 101 is wirelessly powered.

The first acoustic frequency 108 is different from the second acoustic frequency 109, the first vibration mode is different from the second vibration mode, and the first phase is different from the second phase. For instance, the first phase may be the opposite of the second phase, i.e., the second vibration mode may be such that the first and the second electrode 105, 106 are moved in anti-phase by the vibration.

Figure 2:
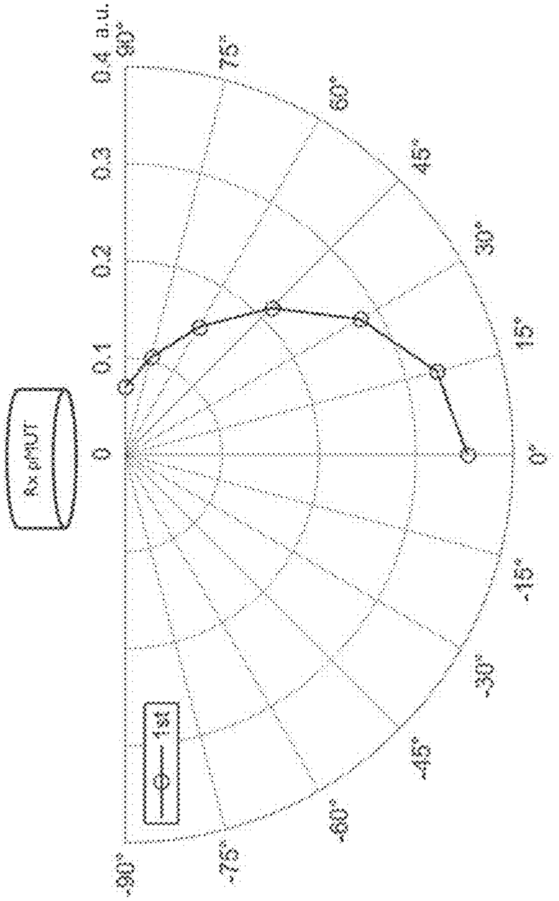
FIG. 2 shows a directivity diagram of a receiver pMUT with its main lobe being associated with a first resonance frequency.

The amount of power received by a conventional receiving device from a given direction may be dependent on the characteristics of its lobes, for example, the exemplary lobe shown in FIG. 2, and may be enhanced by increasing the directivity in that direction. In particular, FIG. 2 shows a directivity diagram of a conventional receiver pMUT with its main lobe associated with a first resonance frequency. The symmetrical part is omitted in FIG. 2.

A conventional receiver with high directivity may see the receiving power diminish rapidly as the deviation from the principal direction (e.g., of maximum captured power) increases. For example, for ultrasonic receivers in medical implants, the tilt of the receivers is a common misalignment issue. Both conventional ultrasonic transducers and pMUTs have quite narrow receive directivity patterns. In other words, they may not efficiently receive ultrasonic waves at large angles of incidence, as for example shown with the lobe profile in FIG. 2. Thus, pMUTs may be very sensitive to rotational misalignment. This insufficient misalignment tolerance may conventionally not be improved without compromising on the maximum power delivered to a load, and thus the maximum achievable power efficiency.

Figure 3:
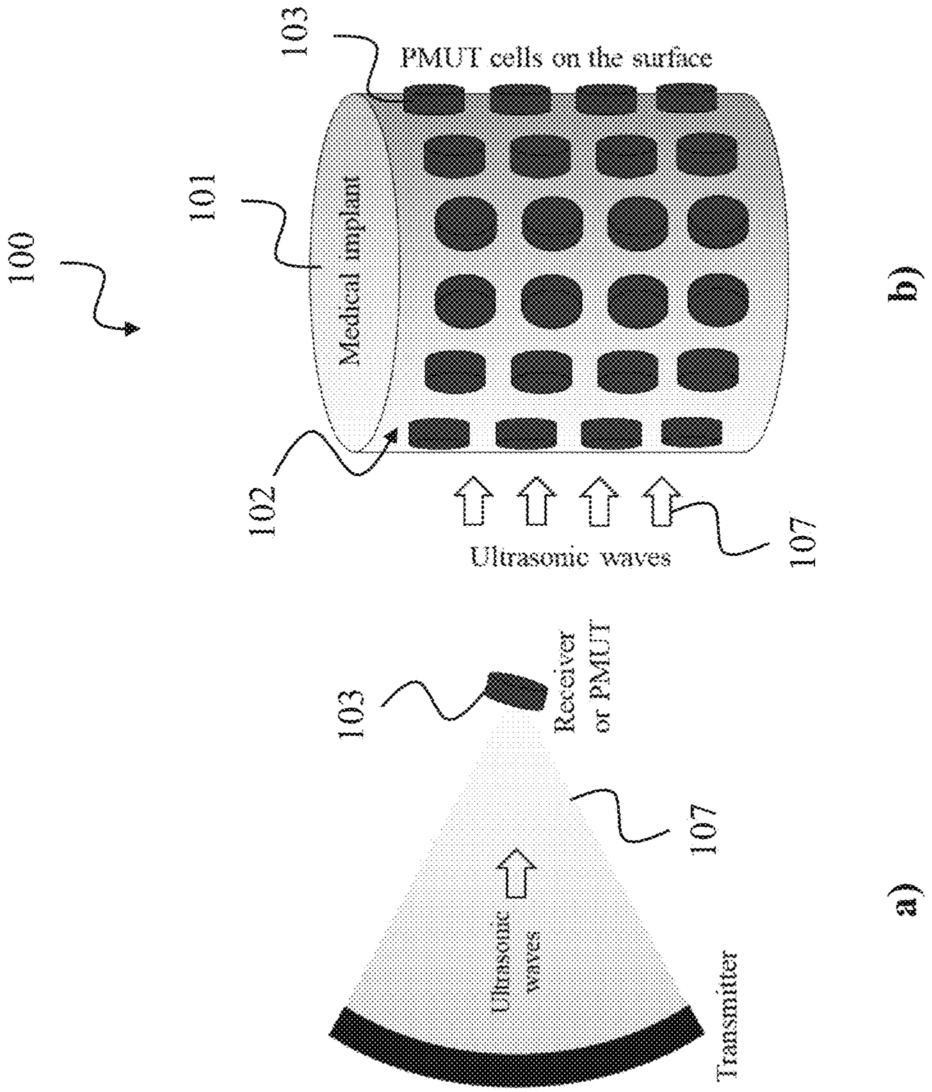
FIG. 3 shows a wireless acoustic power receiver applied to a medical implant, according to this disclosure.

In contrast, the wireless acoustic power receiver 100 of this disclosure may suffer less from such misalignments. FIG. 3 shows an example of such a wireless acoustic power receiver 100, which can exemplarily be applied to a medical implant. FIG. 3 particularly shows an implantable wireless acoustic power receiver 100 and its working principle, with FIG. 3*a* showing the detection of acoustic waves emitted by one or multiple transmitters, and with FIG. 3*b* showing the arrangement of the transducers 103 integrated to the surface of a receiver sheet that encloses an implanted medical device, which is one possible application of this disclosure.

For example, the wireless acoustic power receiver 100 may comprise a thin sheet wrapping conformally around a cylinder (or similar shape) and thus having an outer surface on which an array of 1D arrays of periodically arranged acoustic transducers 103, e.g., pMUTs or cMUTs, can be integrated, and an inner surface connecting the transducers 103 to a circuit, to transform an acoustic wave into an electrical signal.

For example, a thin flat sheet may be formed with all components integrated, and then folded or rolled to form a structure with a closed cross-section. The two ends of the sheet may be attached with an interlocking joint allowing to perfectly align the two ends, and then the two ends may be welded together. Such a form factor may be desirable in medical implant applications as one example.

The efficiency of energy transmission may be dependent on the directivity and the angle of incidence of the incoming wave. Thus, to enable efficient charging from a transmitter that could, for example, be placed anywhere around a main axis of its cylindrical target, the shown implantable wireless acoustic power receiver 100 may be used, which may comprise the flexible array of pMUTs 103 mounted on a cylindrical implantable device.

The above-mentioned transducers 103 may moreover receive simultaneously at least two acoustic waves 107 of different frequencies 108, 109 and/or two different acoustic frequencies of the same acoustic wave. For example, the flexible pMUT array may receive dual-frequency acoustic or ultrasonic waves at a broad range of angles of incidence. This may find use in applications such as charging of implanted medical devices, biological tissues stimulation, and/or the powering of wearables, transducers, and actuators located in remote areas.

A dual-frequency pMUT as transducer 103 can accordingly increase the bandwidth or the number of frequency bands. A dual-frequency pMUT can also be used to significantly widen the receive directivity pattern. Since dual-frequency pMUTs can receive waves (e.g., ultrasonic waves) at large angles of incidence, they can be placed on a curved surface such as a cylinder to increase the total receive power with a minimized form factor while keeping a constant 1D phase wave front.

Figure 4:
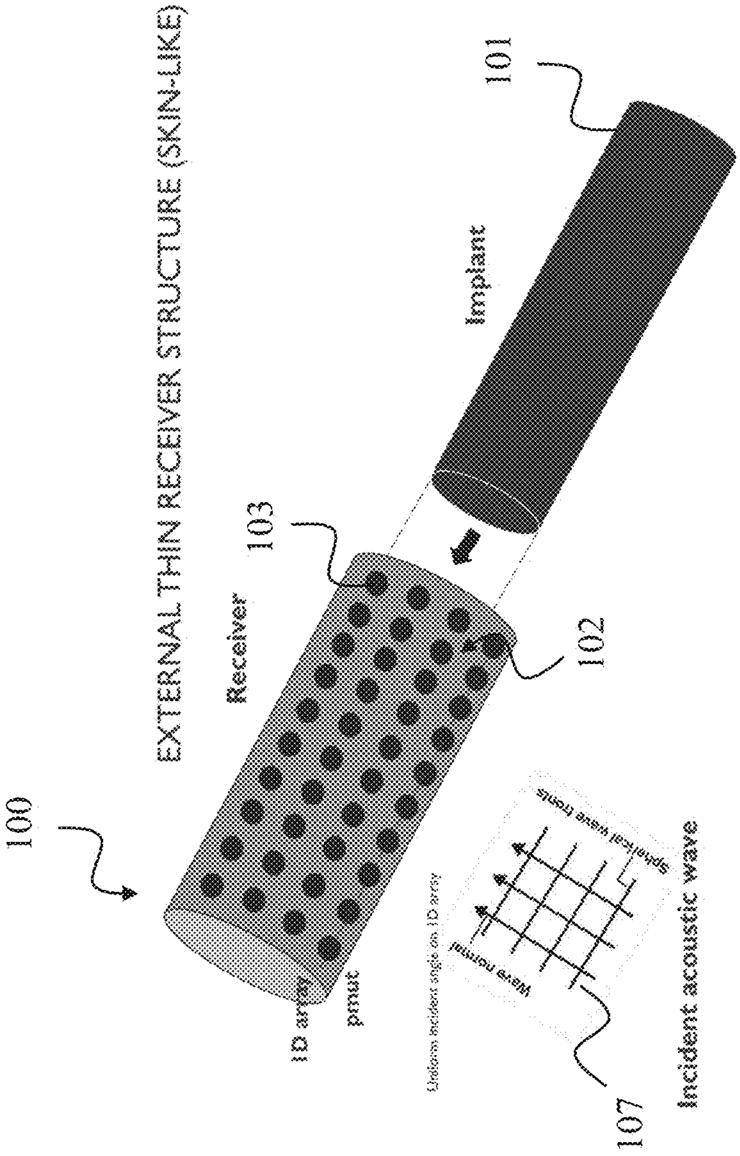
FIG. 4 shows an acoustic power receiver with a medical implant and for receiving acoustic waves with spherical wavefronts from a transmitter, according to this disclosure.

FIG. 4 shows an exemplary wireless acoustic power receiver 100 with a medical implant and receiving acoustic waves with spherical wavefronts from a transmitter, according to this disclosure.

For example, a 1D array of transducers 103 as shown in FIG. 4 may be well-aligned to capture the incident wavefront. Medical implants and ultrasound focus may be shaped in capsules or spheres with curved surfaces. Properly placing pMUT cells on the curved surfaces may improve the power reception. The pMUT cells at various positions may have different angles of incidence to ultrasonic waves.

As shown in FIG. 4, the wireless acoustic power receiver 100 may be equipped with dual-frequency transducers 103 such as the above-mentioned pMUTs. Series of such transducers 103 may respectively be aligned in a 1D array to efficiently capture the energy transported by each incident wave front. To further improve the reception despite the sensitivity variability due to the directionality of the waves, multiple such 1D arrays may be built all over the circumference of the curved surface of a receiver sheet. For example, the transducer cells may be configured in an array of 1D arrays over the outer surface of the sheet.

Inside the volume formed by the sheet, circuits, and implant elements, for example, batteries, circuitries, actuators, sensors, or other transducers, may be fitted.

The one or more transducers 102 of the wireless acoustic power receiver 100 of FIG. 4 may again be dual-frequency transducers, as each transducer 103 may efficiently capture acoustic waves at two or more frequencies. Their configuration may be adapted accordingly. Each transducer may, for example, be a pMUT or a cMUT, or even conventional transducers modified to fit this criterion.

Figure 5:
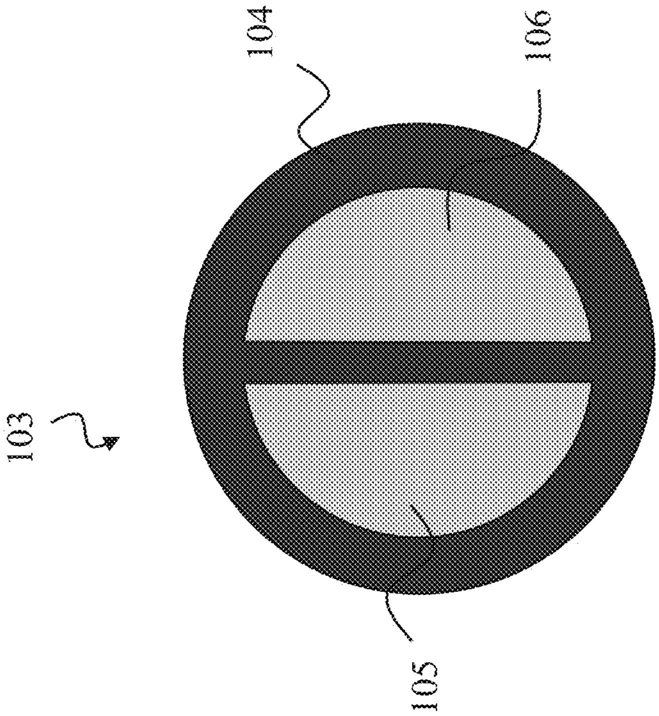
FIG. 5 shows an exemplary pMUT according to this disclosure.

FIG. 5 shows an exemplary dual-frequency transducer 103 being a pMUT with a circular fixed boundary and comprising a pair of symmetrical electrodes 105, 106 and a membrane 104, wherein the dual-frequency transducer 103 is shown in top-view. The shape of the electrodes 105, 106 may or may not be semi-circular in some examples.

The pair of symmetrical electrodes 105, 106 may, for example, capture, in the case of a membrane 104 with circular fixed boundary, the vibration modes (0,1) and (1,1).

FIG. 5 shows a pair of symmetrical electrodes 105, 106 forming "front or back" electrode layers that are sandwiching with a "back or front" electrode layer a flexible membrane 104 comprising a piezoelectric layer.

After being integrated to the sheet, the one or more transducers 102 may be covered with a thin electrical insulation layer, for example, made of biocompatible soft materials, to protect the exposed electrode(s) 105, 106 from the outside environment. For example, a non-conductive polymer layer such as a polyimide film or a parylene film may be used. The polyimide film may be formed by lamination, metallization, punching, or adhesive coating. The parylene film may be formed by chemical vapor deposition or atomic layer deposition.

PMUTs have a series of frequency bands and may have different directivity patterns at different frequencies. In general, the higher the working frequency, the stronger the attenuation in the medium may be. Thus, the frequency bands that are close to the fundamental frequency may be preferred for wireless power transfer to penetrate further and reach a receiver located at a larger distance.

For an exemplary dual-frequency pMUT using the first two symmetric vibration modes (0,1) and (0,2), the second center frequency, which is about 5 times the first center frequency, may be relatively too high for WPT applications. The vibration mode (1,1) may be used instead along with the (0,1) vibration mode. Hence, the second center frequency may be then only about 2.5 times the first center frequency.

Another feature of each acoustic transducer 103 of the one or more acoustic transducers 102 may be that the acoustic transducers 103 can simultaneously capture the energy of the two different frequencies 108, 109 at once.

Figure 6:
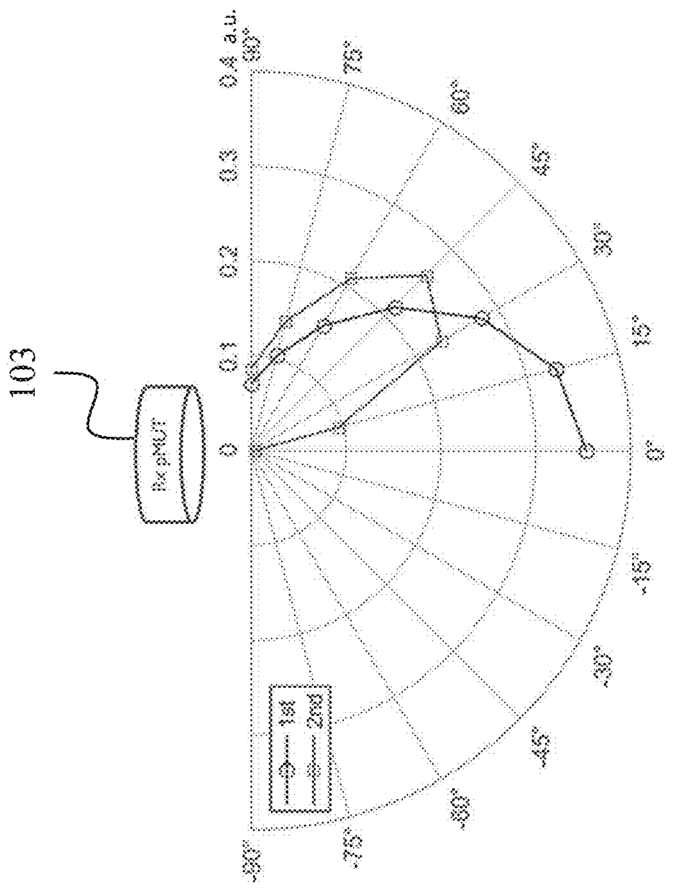
FIG. 6 shows directivity patterns of an exemplary acoustic transducer according to this disclosure.

FIG. 6 shows the directivity patterns of an exemplary acoustic transducer 103 according to this disclosure.

Figure 7B:
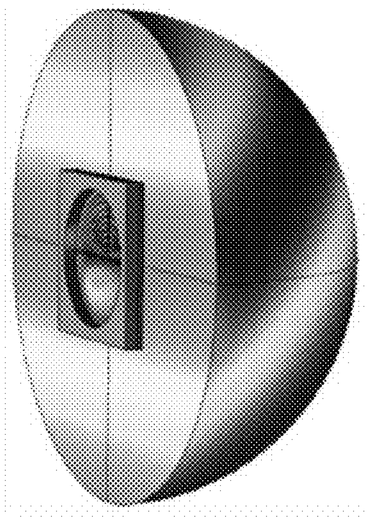
FIG. 7*b* shows an exemplary vibration mode at 2.5 MHz.
Figure 7A:
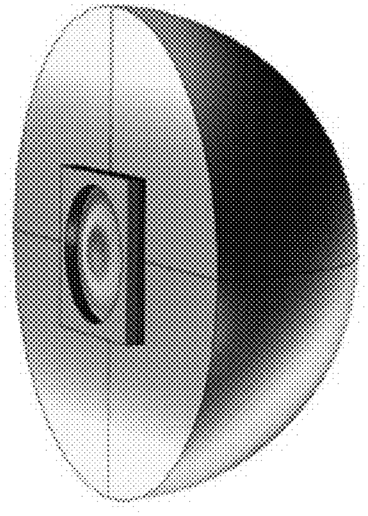
FIG. 7*a* shows an exemplary vibration mode at 1 MHz.

Exemplary associated vibration modes that can be combined at an incident angle of 45°, with respect to the normal to the diaphragm 104, are represented by FIG. 7*a* and FIG. 7*b*.

FIG. 7*a* shows an exemplary vibration mode at 1 MHz according to this disclosure.

FIG. 7*b* shows an exemplary vibration mode at 2.5 MHz according to this disclosure.

FIG. 6 and FIG. 7 show the operation of a dual-frequency pMUT receiver with a diaphragm 104 having a circular fixed boundary. The diaphragm 104 may be efficiently excited by a first resonance frequency 108 at 1 MHz and by a second resonance frequency 109 at about 2.5 MHz.

FIG. 6 shows a directivity diagram for both frequencies 108, 109 and for angles up to 90° with respect to the direction of maximum sensitivity. The symmetrical part is omitted in FIG. 6.

FIG. 7*a* shows a representation of the vibration mode associated with the first resonance frequency and with the incident wavefront coming at an angle of 45° with respect to the normal of the diaphragm 104. FIG. 7*b* shows a representation of the vibration mode associated with the second resonance frequency and with the incident wavefront coming at an angle of 45° with respect to the normal of the diaphragm 104.

The receive directivity of a dual-frequency pMUT utilizing vibration modes of (0, 1) and (1, 1) may be a combination of the receive directivity of a single-frequency pMUT working at (0, 1) mode and that working at (1, 1) mode. The receive directivity of dual-frequency pMUT may be broadened by adjusting the shape and size of the pMUT diaphragm 104.

Figure 8:
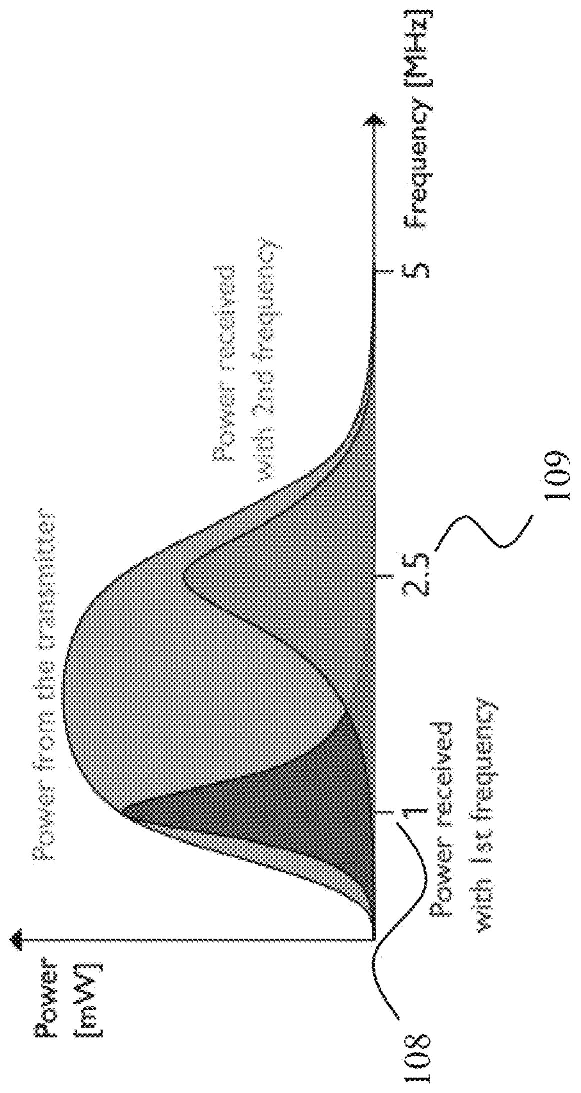
FIG. 8 shows an exemplary power transfer from a transmitter with a bandwidth covering the frequencies of modes (0,1) and (1,1).

FIG. 8 shows power transfer from a transmitter with a bandwidth covering the frequencies of modes (0,1) and (1,1) according to this disclosure.

The dual-frequency transducers 103 can be used to capture energy from transmitters sending waves at both the first acoustic frequency 108 and the second acoustic frequency 109 at the same time, but also transmitters sending waves in a bandwidth covering the two acoustic frequencies 108, 109, as shown in FIG. 8. For example, the latter may be less efficient with mode (0,1) and (0,2) as the second frequency may be too high.

The various transducers 102 may each be connected to a circuit allowing for the extraction of the received signal 114, 115, 116 associated to each mode. The different modes may then be considered as multiple independent powering channels. This can be achieved with matching circuits 117, 118, e.g., an impedance matching circuit for each electrode 104, 105.

Figure 9:
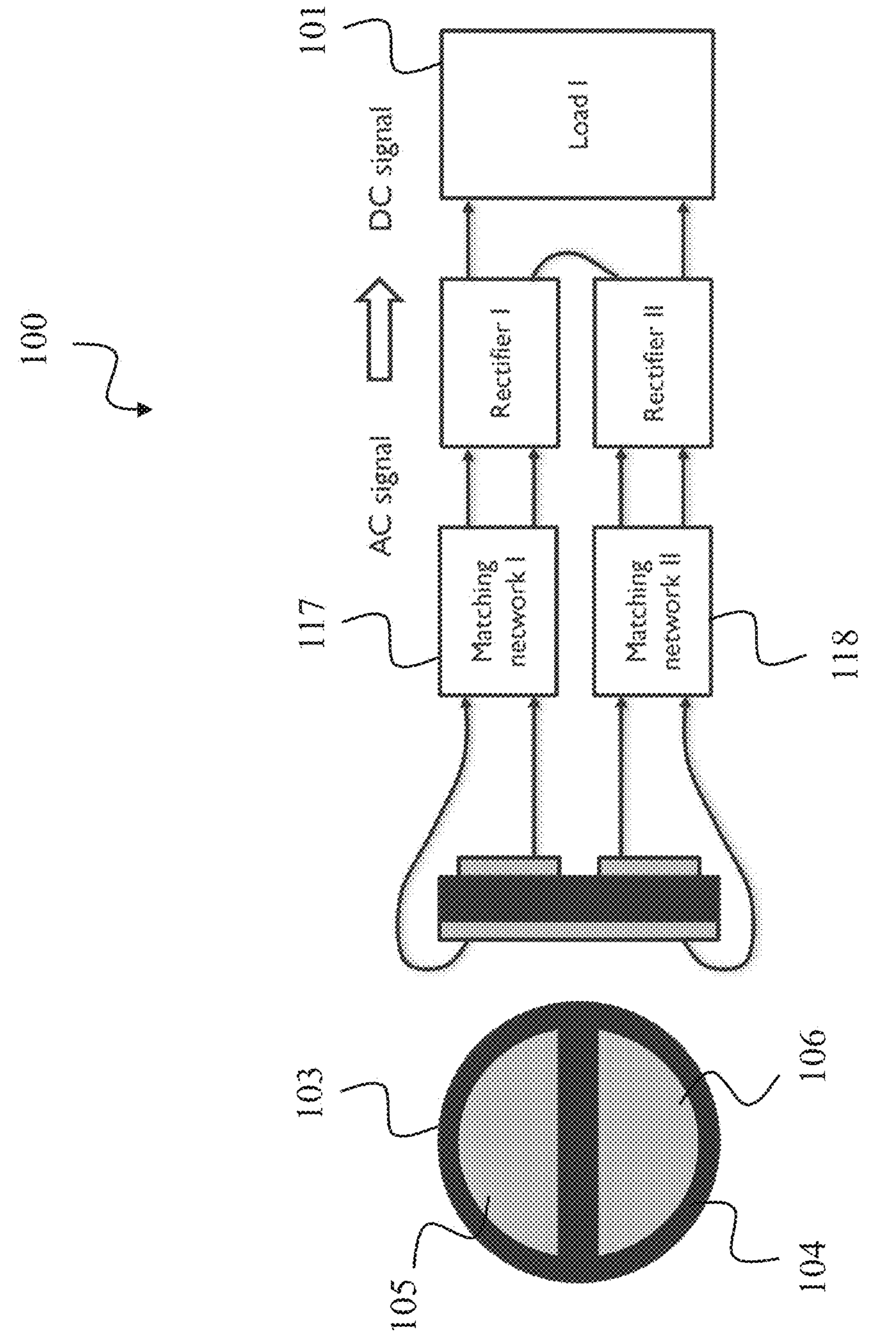
FIG. 9 shows an exemplary circuit for a wireless acoustic power receiver according to this disclosure, the exemplary circuit being associated with a pMUT for transforming the received AC signals into DC signals for the load.

FIG. 9 shows an exemplary circuit associated with a pMUT 103 for transforming the received AC signals into DC signals for the load 101 according to this disclosure. The pMUT 103 may correspond to the pMUT 103 shown in FIG. 5.

Each of the matching circuits 117, 118 may be connected to one of the symmetrical "front or back" electrode and the "back or front" electrode on the other side of the diaphragm 104, for example, flexible membrane 104. This configuration may allow for the analysis of the displacement of various portions of the diaphragm 104, and then the extraction of the modes.

Acoustic waves hold the advantage of penetrating deeply due to low attenuation, being able to be focused on a small area, and allowing the receivers to be very small, due to the small wavelengths used. However, there may be limitations by impedance mismatch effects where the waves are reflected back under some conditions at the interface between different media.

A wireless acoustic power receiver 100 according to this disclosure may comprise a large array of transducers 103 that are each oriented in various directions, so that they can efficiently capture waves 107 coming from any direction. Additionally, with multi-modal transducers, the capture of waves 107 with greater incident angle may be enabled. Combining the two, it can be inferred that the effective detection surface for a wave incoming at a given angle may be larger compared to conventional technologies.

The wireless acoustic power receiver 100 can simultaneously be powered by multiple waves 107 of different frequencies 108, 109, as if it operates with multiple channels.

Figure 10:
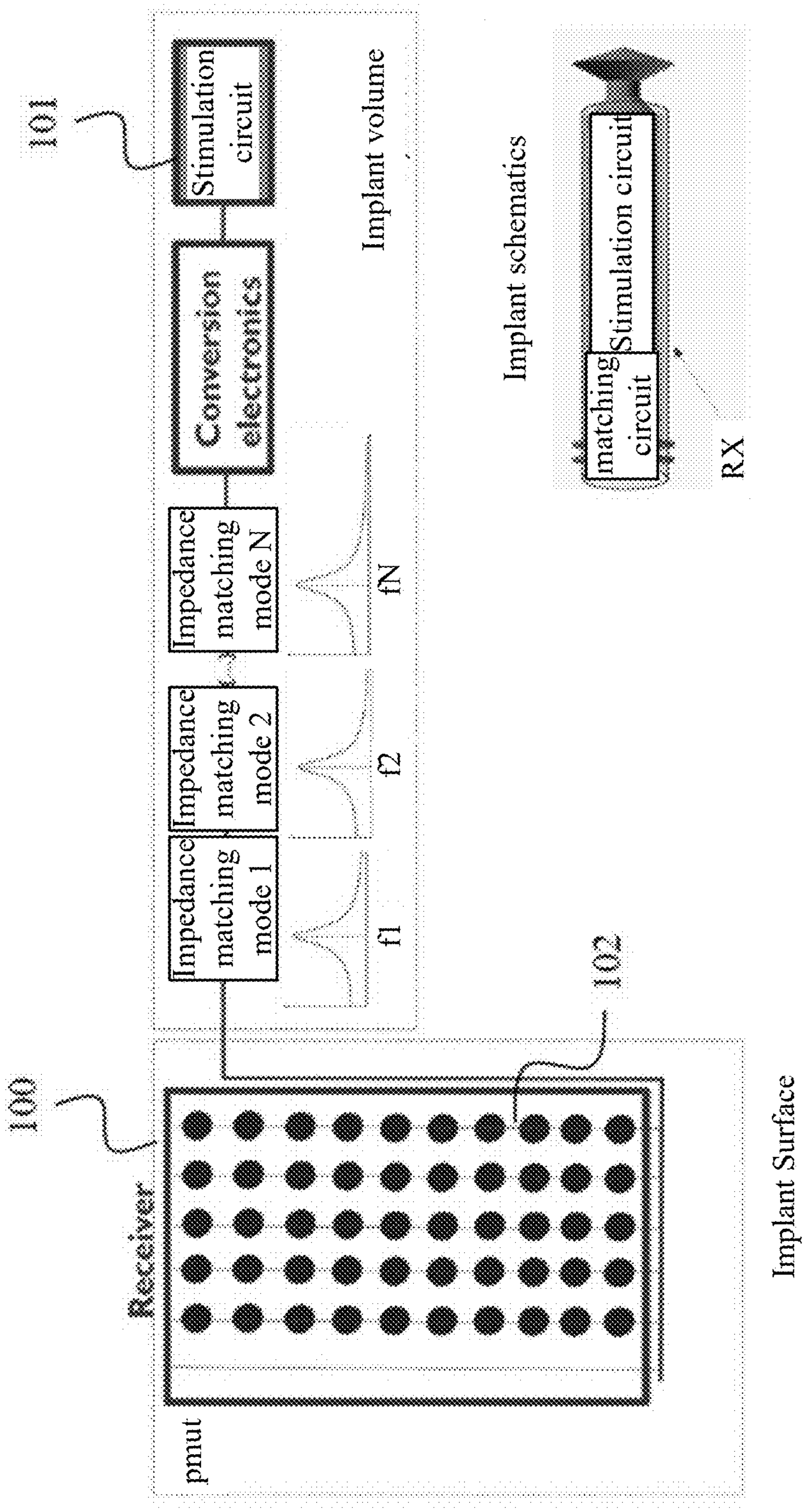
FIG. 10 shows an exemplary application of the wireless acoustic power receiver according to this disclosure to a neural/tissue stimulation implant.

FIG. 10 shows an exemplary application of the wireless acoustic power receiver 100 to the load 101 according to this disclosure. In this example, the load 101 includes a neural/tissue stimulation implant.

The transducer sheet may be used to power the load 101 that, as noted above, can stimulate biological tissues, for example, a heart, muscles, nerves, neurons.

The various arrays of transducers 103 on the outer surface of the sheet may be connected to some inner circuitry. The signals may be provided through impedance matching circuits 117, 118 that extract the power component of each mode of vibration. The received power may then be converted into an acceptable input for the stimulation circuit that controls the stimulation actuator.

Figure 11:
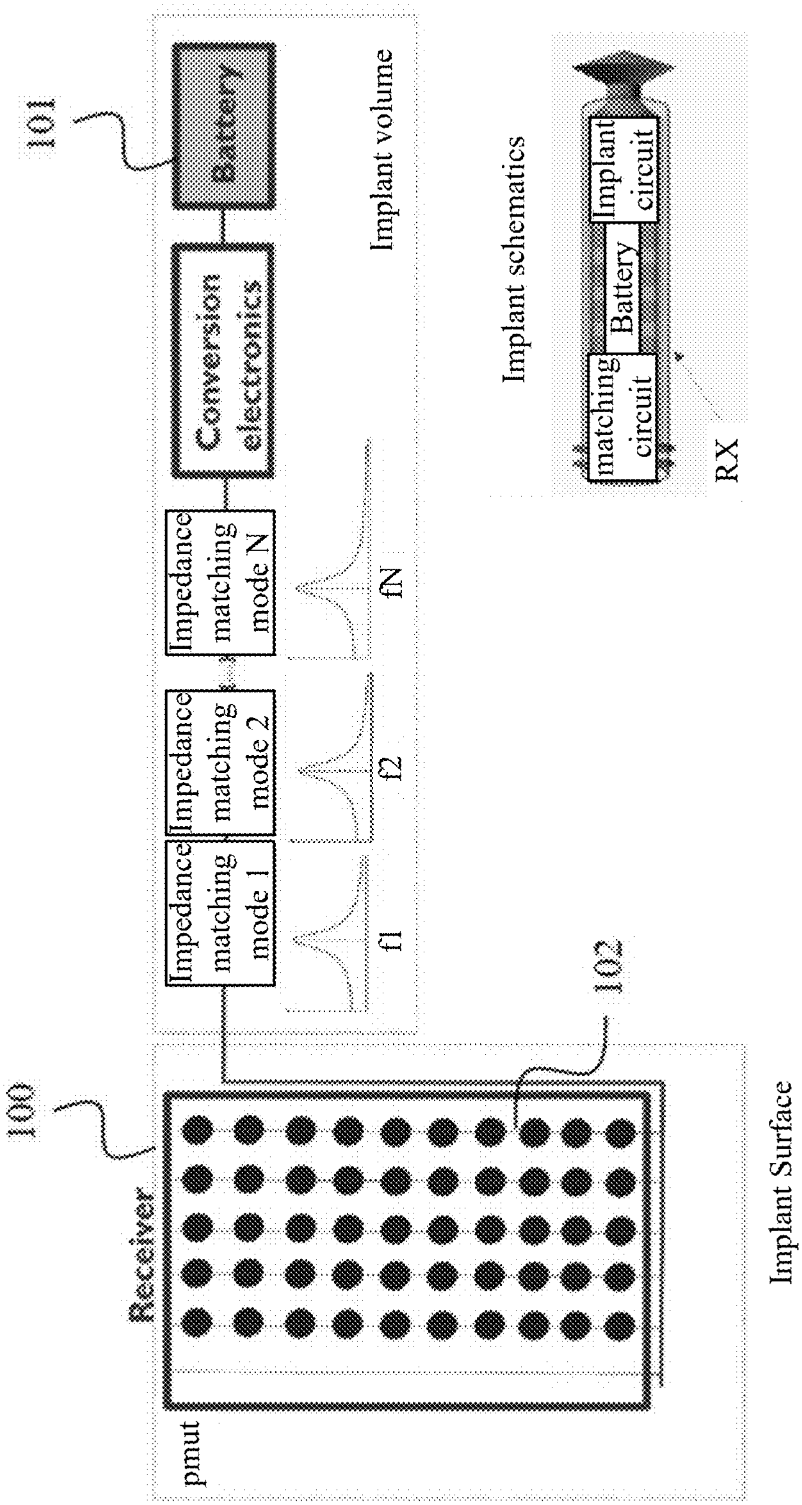
FIG. 11 shows an exemplary application of the wireless acoustic power receiver according to this disclosure to an implant equipped with a battery.

FIG. 11 shows an exemplary application of the wireless acoustic power receiver 100 to an implant equipped with a battery (e.g., load 101).

The transducer sheet may be used to power a battery (e.g., load 101) that stores electrical energy and that can be used over an extended period to power (bio)electronical components, for example, transducers or actuators. Various arrays of transducers on the outer surface of the sheet may be connected to some inner circuitry. The signals may be provided through impedance matching circuits 117, 118 that extract the power component of each mode of vibration. The received power may then be converted into an acceptable input for the battery (e.g., load 101), for example by using rectifiers to transform the received AC power into DC power. The battery (e.g., load 101) may allow the implant circuit to be operated to control the various integrated instruments.

FIGS. 10 and 11 respectively show a generic case with N modes, wherein N is a natural number larger than 1.

For example, the wireless acoustic power receiver 100 may comprise a sheet equipped with an array of 1D arrays of acoustic transducers 103 and disposed over a curved surface such as a cylinder so that the transducers 103 can be oriented in various directions and capture waves coming at various incident angles or range of angles. The transducers 103 themselves and their associated circuitry may be built so that they can capture simultaneously waves of at least two frequencies and therefore exploit multiple modes of vibrations.

For example, the wireless acoustic power receiver 100 may have improved power efficiency based on three mechanisms: firstly, the use of an array of 1D arrays of transducers 103 may increase a capture surface. Secondly, even if the array is disposed on a curved surface, the transducers may exploit at least one mode of vibration that complement the main one to capture waves coming at incident angles deviating from the normal to the surface. Lastly, the transmitter may simultaneously transfer power through more than one frequency, which means that more power can be provided to the receiver. Hence, the effective capture surface can be increased to more efficiently capture power and multiple frequency channels can be exploited to transfer energy.

The wireless acoustic power receiver 100 may improve misalignment problems by having 1D arrays of transducers oriented in various directions, for example, all around the axis of a cylinder, and by using transducers exploiting modes with directivities that complement themselves in various directions. The energy transported in the waves can thereby be efficiently captured, regardless of the direction they are coming from.

A wireless acoustic power receiver 100 may efficiently receive power over a long distance, have low attenuation through media (e.g., conductive media including biological tissues), may be compact (e.g., occupy a small volume), may be robust against misalignment, may have a high power density, and may be safe for applications to humans.

The wireless acoustic power receiver 100 may comprise a processor. Generally, the processor may be configured to perform, conduct or initiate the various operations of the wireless acoustic power receiver 100 described herein. The processor may comprise hardware and/or may be controlled by software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors.

The wireless acoustic power receiver 100 may further comprise memory circuitry, which stores one or more instruction(s) that can be executed by the processor, in particular under control of the software. For instance, the memory circuitry may comprise a non-transitory storage medium storing executable software code which, when executed by the processor, causes the various operations of the wireless acoustic power receiver 100 to be performed. In one embodiment, the wireless acoustic power receiver 100 may comprise one or more processors and a non-transitory memory connected to the one or more processors. The non-transitory memory may carry executable program code which, when executed by the one or more processors, causes the wireless acoustic power receiver 100 to perform, conduct or initiate the operations or methods described herein.

Figure 12:
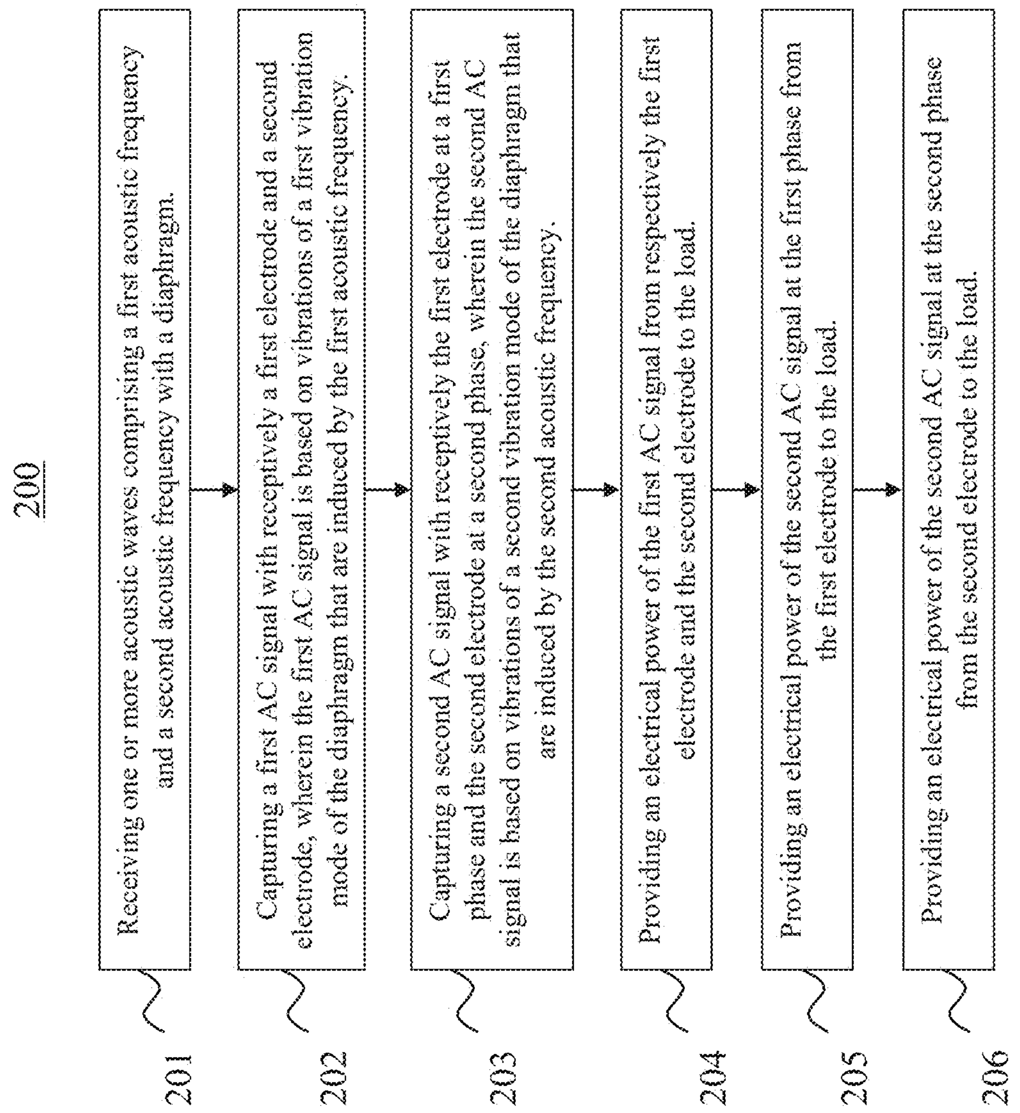
FIG. 12 shows a method for operating a wireless acoustic power receiver according to this disclosure.

FIG. 12 shows a method 200 according to this disclosure. The method 200 is a method of operating a wireless acoustic power receiver 100 for a load 101. Generally, the receiver comprises one or more acoustic transducers 102, each acoustic transducer 103 comprising a diaphragm 104, a first electrode 105 provided on the diaphragm 104, and a second electrode 106 provided on the diaphragm 104.

For each acoustic transducer 103 of the one or more acoustic transducers 102, the method comprises the following steps. The method 200 comprises a step 201 of receiving one or more acoustic waves 107 comprising a first acoustic frequency 108 and a second acoustic frequency 109 with the diaphragm 104. Further, the method 200 comprises a step 202 of capturing an AC signal with receptively the first electrode 105 and the second electrode 106, wherein the first AC signal 110 is based on vibrations of a first vibration mode of the diaphragm 104 that are induced by the first acoustic frequency 108. Further, the method 200 comprises a step 203 of capturing a second AC signal 111 with receptively the first electrode 105 at a first phase and the second electrode 106 at a second phase, wherein the second AC signal 111 is based on vibrations of a second vibration mode of the diaphragm 104 that are induced by the second acoustic frequency 109. Further, the method 200 comprises a step 204 of providing an electrical power of the first AC signal 114 from respectively the first electrode 105 and the second electrode 106 to the load 101. Further, the method 200 comprises a step 205 of providing an electrical power of the second AC signal at the first phase 115 from the first electrode 105 to the load 101. Further, the method 200 comprises a step 206 of providing an electrical power of the second AC signal at the second phase 116 from the second electrode 106 to the load 101.

Generally, the first acoustic frequency 108 is different from the second acoustic frequency 109, the first vibration mode is different from the second vibration mode, and the first phase is different from the second phase.

The disclosure has been described in conjunction with various embodiments as examples as well as implementations. However, other variations can be understood and effected by those persons skilled in the art and practicing the claimed matter, from the studies of the drawings, this disclosure and the claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A wireless acoustic power receiver for a load, the receiver comprising one or more acoustic transducers, each acoustic transducer comprising a diaphragm, a first electrode provided on the diaphragm, and a second electrode provided on the diaphragm, wherein each acoustic transducer of the one or more acoustic transducers is configured to:

receive one or more acoustic waves comprising a first acoustic frequency and a second acoustic frequency with the diaphragm, wherein the first acoustic frequency is different from the second acoustic frequency;

capture a first alternating current (AC) signal with receptively the first electrode and the second electrode, wherein the first AC signal is based on vibrations of a first vibration mode of the diaphragm that are induced by the first acoustic frequency;

capture a second AC signal with receptively the first electrode at a first phase and the second electrode at a second phase, wherein the second AC signal is based on vibrations of a second vibration mode of the diaphragm that are induced by the second acoustic frequency, wherein the first vibration mode is different from the second vibration mode, and wherein the first phase is different from the second phase;

provide an electrical power of the first AC signal from respectively the first electrode and the second electrode to the load;

provide an electrical power of the second AC signal at the first phase from the first electrode to the load; and provide an electrical power of the second AC signal at the second phase from the second electrode to the load.

2. The receiver according to claim 1, wherein for each acoustic transducer the receiver further comprises:

a first dual-frequency impedance matching circuitry adapted to and electrically connected to the first electrode of the acoustic transducer, and electrically connectable to the load; and a second dual-frequency impedance matching circuitry adapted and electrically connected to the second electrode of the acoustic transducer and electrically connectable to the load, wherein each acoustic transducer of the one or more acoustic transducers is configured to:

provide the electrical power of the first AC signal through respectively the first dual-frequency impedance matching circuitry and the second dual-frequency impedance matching circuitry to the load;

provide the electrical power of the second AC signal at the first phase from the first electrode through the first impedance matching circuitry to the load; and provide the electrical power of the second AC signal at the second phase from the second electrode through the second impedance matching circuitry to the load.

3. The receiver according to claim 1, wherein the second acoustic frequency is less than 5 times larger than the first acoustic frequency.

4. The receiver according to claim 1, wherein the first acoustic frequency is less than 5 times larger than the second acoustic frequency.

5. The receiver according to claim 1, wherein the second vibration mode has the next higher resonance frequency of the diaphragm following a resonance frequency of the first vibration mode, or the first vibration mode has the next higher resonance frequency of the diaphragm following a resonance frequency of the second vibration mode.

6. The receiver according to claim 1, wherein each acoustic transducer of the one or more acoustic transducers is configured to simultaneously capture the second AC signal at the first phase and the first AC signal with the first electrode.

7. The receiver according to claim 1, wherein each acoustic transducer of the one or more acoustic transducers is configured to simultaneously capture the second AC signal at the second phase and the first AC signal with the second electrode.

8. The receiver according to claim 1, wherein the one or more acoustic transducers are a plurality of acoustic transducers, and wherein the plurality of acoustic transducers form an array of acoustic transducers on at least one outer surface of the receiver.

9. The receiver according to claim 8, wherein the at least one outer surface forms a closed cross section.

10. The receiver according to claim 8, wherein the array of acoustic transducers comprises one or more one dimensional (1D) arrays of acoustic transducers, each 1D array of acoustic transducers comprising two or more acoustic transducers that are uniformly distributed along the at least one outer surface.

11. The receiver according to claim 8, wherein the at least one outer surface is a curved surface or at least one flat surface.

12. The receiver according to claim 8, wherein the plurality of acoustic transducers comprise a first acoustic transducer and a second acoustic transducer, wherein the first acoustic transducer is configured to receive the one or more acoustic waves at a first angle of incidence relative to the diaphragm of the first acoustic transducer, and wherein the second acoustic transducer is configured to receive the one or more acoustic waves at a second angle of incidence relative to the diaphragm of the second acoustic transducer, wherein the second angle of incidence is different from the first angle of incidence.

13. The receiver according to claim 1, wherein the load is one of: a medical implant, a device for use underwater, a device for use in air, and an Internet of Things system.

14. The receiver according to claim 1, wherein each acoustic transducer of the one or more acoustic transducers comprises a piezoelectric diaphragm.

15. The receiver according to claim 1, wherein each acoustic transducer of the one or more acoustic transducers is a piezoelectric micromachined ultrasound transducer (pMUT).

16. The receiver according to claim 1, wherein each acoustic transducer of the one or more acoustic transducers is a capacitive micromachined ultrasound transducer (cMUT).

17. The receiver according to claim 1, wherein, for each acoustic transducer of the one or more acoustic transducers, the first electrode and the second electrode are formed symmetrical to each other and/or are arranged symmetrically on the diaphragm.

18. The receiver according to claim 1, wherein, for each acoustic transducer of the one or more acoustic transducers, at least one of the first electrode, the second electrode, and the diaphragm has a shape that is one of: elongated, square, rectangular, oval, apodised, and circular.

19. The receiver according to claim 1, wherein an inner surface of the receiver comprises at least one of: a battery, a circuitry, an actuator, a sensor, and one or more other transducers.

20. A method of operating a wireless acoustic power receiver for a load, wherein the receiver comprises one or more acoustic transducers, each acoustic transducer comprising a diaphragm, a first electrode provided on the diaphragm, and a second electrode provided on the diaphragm, wherein, for each acoustic transducer of the one or more acoustic transducers, the method comprising:

receiving one or more acoustic waves comprising a first acoustic frequency and a second acoustic frequency with the diaphragm, wherein the first acoustic frequency is different from the second acoustic frequency;

capturing a first alternating current (AC) signal with receptively the first electrode and the second electrode, wherein the first AC signal is based on vibrations of a first vibration mode of the diaphragm that are induced by the first acoustic frequency;

capturing a second AC signal with receptively the first electrode at a first phase and the second electrode at a second phase, wherein the second AC signal is based on vibrations of a second vibration mode of the diaphragm that are induced by the second acoustic frequency, wherein the first vibration mode is different from the second vibration mode, and wherein the first phase is different from the second phase;

providing an electrical power of the first AC signal from respectively the first electrode and the second electrode to the load;

providing an electrical power of the second AC signal at the first phase from the first electrode to the load; and providing an electrical power of the second AC signal at the second phase from the second electrode to the load.

* * * * *